Jan. 20, 1953  G. W. CARUOLO  2,625,977
ANTISKID CHAIN AND MOUNTING MEANS THEREFOR
Filed Nov. 18, 1949  3 Sheets-Sheet 1

Inventor

George W. Caruolo

By Clarence A. O'Brien
and Harvey B. Jacobson
Attorneys

Jan. 20, 1953     G. W. CARUOLO     2,625,977
ANTISKID CHAIN AND MOUNTING MEANS THEREFOR
Filed Nov. 18, 1949     3 Sheets-Sheet 2

Inventor

George W. Caruolo

By Clarence A. O'Brien
and Harvey B. Jacobson
Attorneys

Jan. 20, 1953 G. W. CARUOLO 2,625,977
ANTISKID CHAIN AND MOUNTING MEANS THEREFOR
Filed Nov. 18, 1949 3 Sheets-Sheet 3
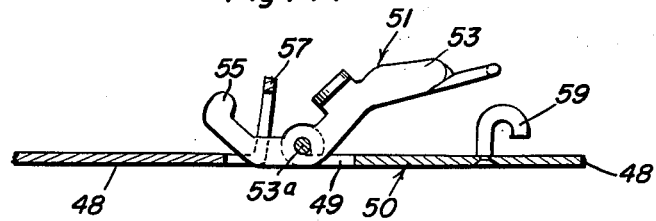
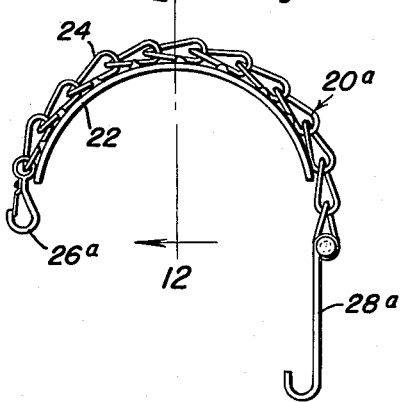
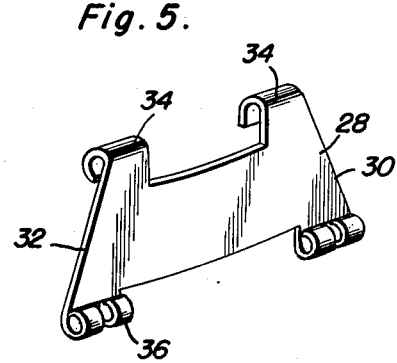
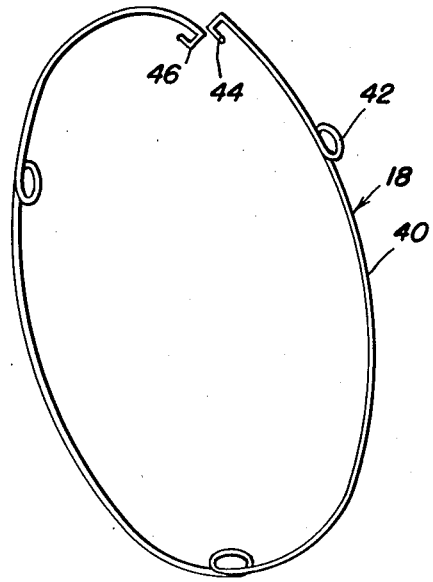
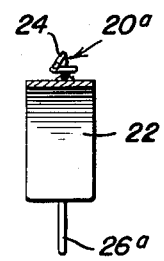
Inventor
George W. Caruolo
By Clarence A. O'Brien
and Harvey B. Jacobson
Attorneys Patented Jan. 20, 1953

2,625,977

UNITED STATES PATENT OFFICE 2,625,977

ANTISKID CHAIN AND MOUNTING MEANS THEREFOR

George W. Caruolo, Westerly, R. I.

Application November 18, 1949, Serial No. 128,058

5 Claims. (Cl. 152—242)

The present invention relates to certain new and useful improvements in attachable and detachable anti-skid cross-chains and means mounted on opposite inner and outer sides of a vehicle wheel whereby said cross-chains may be attached and detached without having to back up the vehicle as is ordinarily required.

An object of the invention is to structurally, functionally and otherwise improve upon similarly constructed and performing structures and in doing so to provide a novel contribution to the art, one in which manufacturers and users will find many of their requirements and needs satisfactorily met.

Another important object of this invention is to provide anchoring members, adapted to be disposed on opposite sides of a tire rim, for securing transverse chain sections about the tire, the chain sections being detachably anchored or secured to the anchoring members in such a manner as to permit the attachment or removal thereof, without jacking up the vehicle and without requiring excessive manual exertion or without involving the use of tools.

More specifically stated there are two so-called anchoring members and one takes the form of a ring or hoop and this is located on the inner side of the vehicle wheel. The other anchoring member, which is applicable to the outside of the vehicle wheel, is characterized by links having overlapping pivotally connected end portions, said links serving to accommodate snap fasteners on the cross-chains which extend transversely across the tread of the tire casing. The cross-chains are provided on their inner ends with special plates which have hooks to releasably engage with the inner anchoring member which latter has sufficient inherent spring tension to assist in fastening the hooked plates in required positions. The inner and outer anchoring members are fastened in their positions on opposite sides of the wheel by adaptor devices which cooperate with the usual circumferentially spaced slots in the wheel disk, said adaptor devices being made of coacting bars as hereinafter specifically described.

These and ancillary objects and structural features of merit are attained by this invention, a preferred embodiment of which is set forth in the following description and illustrated in the accompanying drawings, wherein:

Figure 4 is an enlarged detailed view, partly in section and partly in elevation, of the locking latch-type fastener means provided for the outer anchoring member;

Figure 5 is a view in perspective of one of the attaching plates for pivotally securing corresponding ends of the transverse cross-chains or chain sections to the inner anchoring member;

Figure 7 is a view in perspective of the hoop-like inner anchoring member or ring;

Figure 11 is an elevational view of one of the chain sections modified in construction, and, Figure 12 is a transverse sectional view taken on line 12—12 of Figure 11.

In the accompanying drawings, the numeral 10 generally designates an automobile wheel of conventional construction, which consists of a rim 12 upon which a pneumatic tire 14 is mounted.

Figure 3:
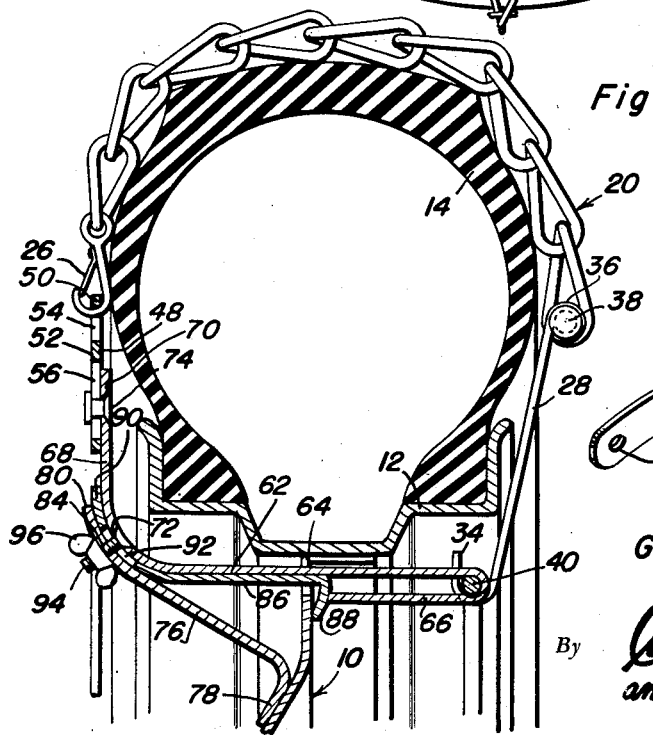
Figure 3 is an enlarged sectional view taken on line 3—3 of Figure 1.
Figure 6:
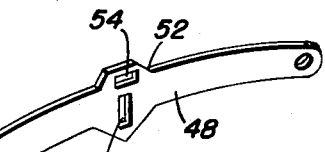
Figure 6 is a view in perspective of one of the links or plates of the outer anchoring member.

The improved anti-skid cross-chains and attaching means include a pair of anchoring members 16 and 18, the anchoring members being adapted to be disposed on opposite sides of the tire rim adjacent to the side walls of the tire. Transverse cross-chains or chain sections 20 are provided and are adapted to be secured, in a detachable manner, to the respective anchoring members 16 and 18 so as to be transversely disposed across the tread of the tire, as seen in Figure 3.

The chain sections 20a, with respect to the modifications in Figures 11 and 12, include an arcuate base plate 22 upon which a plurality of interconnected chain links 24 are welded or otherwise permanently secured.

Figure 2:
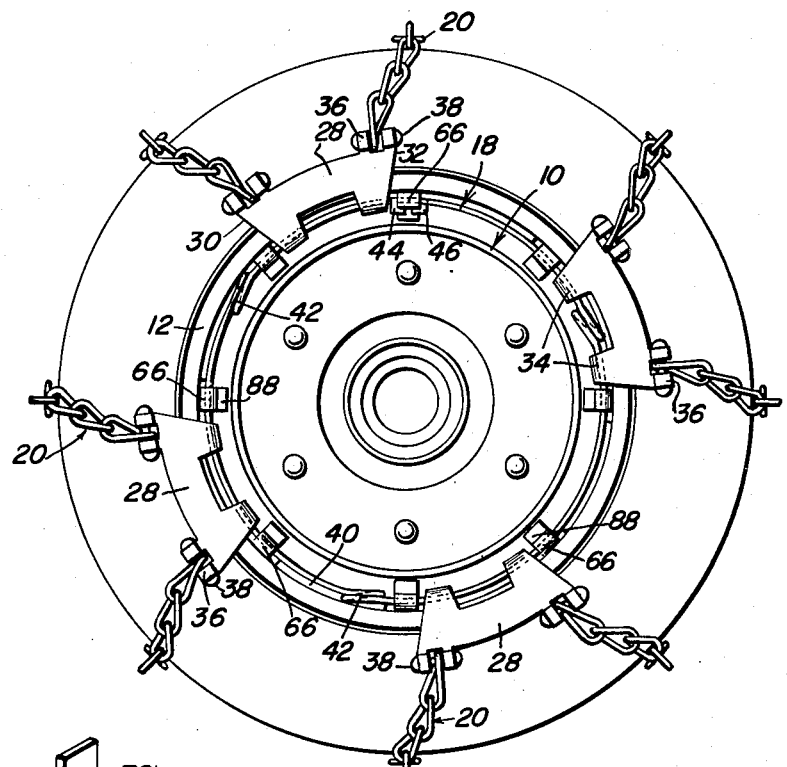
Figure 2 is a side view of the inside of the wheel.
Figure 8:
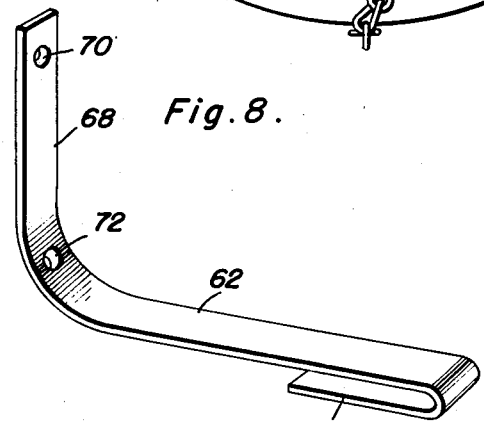
Figures 8–10 are views in perspective of the harnessing straps or bars illustrated in assembled relationship in Figure 3.
Figure 9:
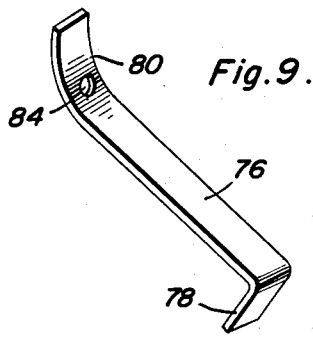
Figure 10:
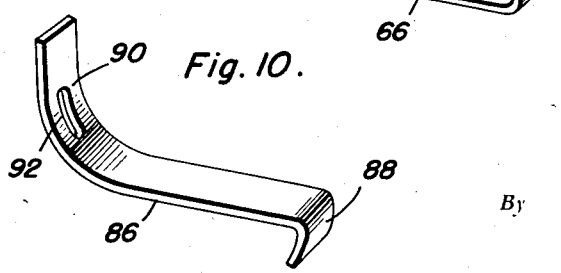

A snap hook 26 is secured to one of the end links of one cross chain and an anchoring plate 28 is pivotally secured to the opposite end link of a pair of cross chains or chain sections, as seen in Figure 2. Reverting to Figures 11 and 12 the corresponding snap hook is denoted at 26a and the anchoring plate by the numeral 28a.

The anchoring plates 28 are substantially H-shaped with diverging side edges 30 and 32. Keeper hooks 34 project from the minor end of the plate 28 and knuckles 36 project from the major end of the plate, as seen in Figure 5. The end links of a pair of chain sections 20 are pivotally mounted on pivot pins 38, which are affixed in the knuckles 36 on the plate. The keeper hooks 34 on the plate are adapted to be detachably fastened to the hook-like anchoring member 18.

As seen in Figure 7, the anchoring member 18 includes a split ring 40 having integral spring coils 42 and having complementary hook ends 44 and 46. When the hooks 44 and 46 are brought together, an anchoring ring is thus defined.

Figure 1:
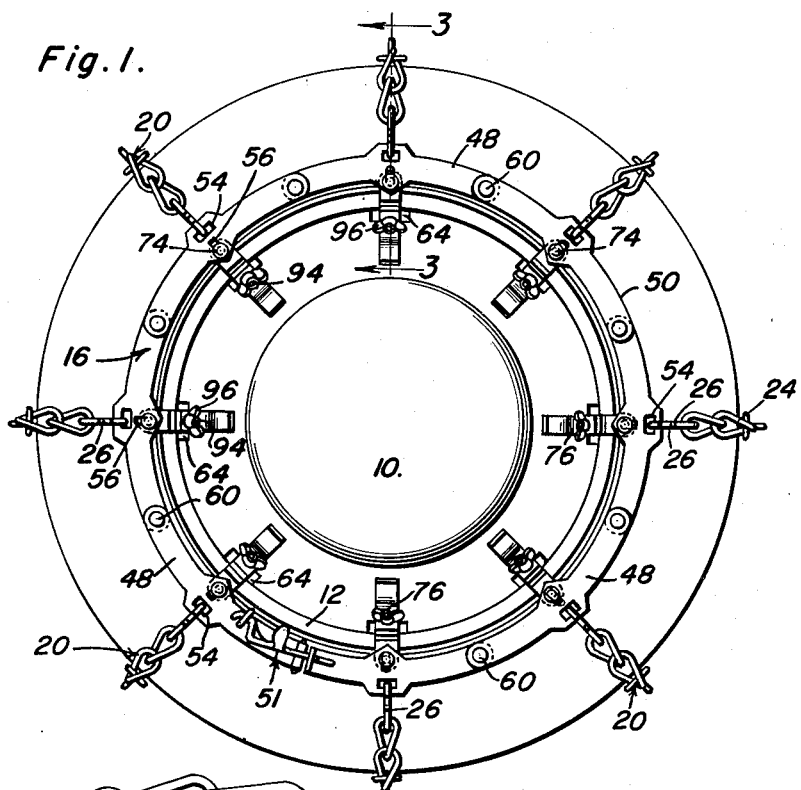
Figure 1 is a side view of an automobile wheel having a chain appliance attached thereto, the chain appliance being constructed in accordance with the principle of this invention.

The anchoring member 16 includes a plurality of overlapping pivotally interconnected arcuate flat links 48, which are joined together to form a ring or annulus 50. The links are formed with an enlarged center section 52 having a longitudinal opening 54 formed therein and a slot 56 transversely positioned therein and intersecting the plane of the opening 54. The opposing ends of the links are apertured as at 58 to receive pivot pins 60 whereby the links are pivotally attached together in a circular formation to define the ring 50. Fastening means 51 is provided for securing the plates together in a circle, the fastening means being carried by the adjacent free ends of two of the links. The preferred fastening means comprises a latch 53 pivoted at 53a between furcations 49 on the special end link or plate 48 at the right in Figure 4, said latch having an angularly disposed thrust finger 55 engaging a laterally bent slotted end or thrust member 57 on the links or plate 48 to the left. When the latch 53 is closed the finger 55 engages thrust member 57 and takes up the slack in the over-all member 16, said latch being then fastened in its closed position by the pivoted keeper hook 59. When the fastening means is drawn up and closed there is little or no slack in the member 16. Therefore, when one desires to bring about limited relative movements between the links 48—48, said fastening means 51 has to be opened up so that the two end links 48—48 in Figure 4 may be partly or wholly separated. Then, there will be sufficient play between all links 48 to permit the snap hooks 26 to be attached or detached, as the case may be. The snap fasteners 26 carried by the free ends of the chain sections are adapted to be inserted in the slots 54 in the links, as seen in Figures 1 and 3.

An L-shaped bar 62 has the end of one limb portion passed through an opening 64 in the wheel 10, said end being formed with an inturned end 66 bent upon the body of the bar to provide a bracket end for attachment to the ring 40. The opposite end 68 of the bar extends laterally and is provided with spaced openings 70 and 72. Rivets 74 are disposed in the openings 70 and slidably fixed within the slots 56 in the links 48 whereby the anchoring members forming the ring 50 are connected to the bars 62.

Bars 86 are formed with flange ends 88, the ends being clamped on the inside of the wheel by means of the bracket ends 66 on the bars 62, as seen in Figure 3. The opposite ends 90 on the bars extend arcuately from the plane of the bars and conform to the curvature of the angular juncture between the body of the bars 62 and the extension 68 thereon. Slots 92 are formed in the ends 90, the slots being registerable with the openings 72 in the bars 62. Bars 76 are provided with flanged ends 78 adapted to be clamped on the outside of the wheel, the opposite ends 80 of the bars being curved outwardly from the bars and extending in opposite directions from the flanges 78. Openings 84 are formed in the ends 80 and are registerable with the openings 72 and slots 92 to receive fastening bolts 94 secured therein by wing nuts 96. It is to be noted that the bars 62 connect the anchoring ring 40 to the anchoring member 50, the bars 62 being locked in connecting positions by means of the clamping bars 86 and 76 which engage the inner and outer surfaces of the wheel and are secured to the bars 62 by means of fastening bolts 94 and wing nuts 96.

To place the chain appliance on a wheel so as to securely fasten the cross-chains about the tire, the latter are first secured to the plates 28, which are gripped on the resilient ring 40, the ring being locked about the wheel axle on the inner side of the wheel by means of the locking or fastening ends 44 and 46. Thus, the ring is first disposed on the inner side of the wheel and the plates 28 are then secured thereto by merely engaging the keeper hooks 34 on the ring. The chain sections then hang over the tire and the snap fasteners 26 are detachably secured to the slots 54 in the individual plates or links 48 constituting the ring 50. The connecting strap 62 is then secured between the anchoring members and the clamping bars or straps are positioned, as seen in Figure 3, and locked to the connecting bar or strap by way of the wing nut 94.

However, since many other modifications and purposes of this invention will become readily apparent to those skilled in the art upon a perusal of the foregoing description, it is to be understood that certain changes in style, size and components may be effected without a departure from the spirit of the invention and within the scope of the appended claims.

Briefly summarized it will be seen that the so-called inner anchoring member is characterized by the hoop-like ring 40 with readily connectible end portions 44 and 46 and tension springs 42. This member is supported in the return bends 66. The limb 68 provides the pin and slot supporting means for the clamping member 50 on the outer side of the wheel. Thus, the intermediate portion of the so-called bar member 62 operates through the slot means 64 and functions as a sort of a saddle for attaching the respective anchoring members 18 and 50 to the wheel. The other clamping bars 86 and 76 are primarily the ways and means for clamping the so-called saddle to the disk portion of the wheel.

Having described the invention, what is claimed as new is:

1. In a tire chain appliance the improvement comprising anchoring members positionable on opposite sides of the tire rim, chain sections transversely positionable over the tire and detachably connected to said anchoring members, anchoring plates interposed between the ends of said chain sections of one side and the anchoring member on that side, said last-mentioned anchoring member being a resilient ring, said anchoring plates being provided with keeper hooks for retention on said ring, and said ends of the chain sections being pivotally secured to said anchoring plates at the sides opposite to said keeper hooks, interconnected ring plates interposed between the ends of said chain sections opposite to the first-mentioned ends and slidably maintained in spaced relation to the side wall of the tire, the juxtaposed ends of said chain sections being detachably secured to said ring plates.

2. In a tire chain appliance the improvement comprising anchoring members positionable on opposite sides of the tire rim, chain sections transversely positionable over the tire and detachably connected to said anchoring members, anchoring plates interposed between the ends of said chain sections of one side and the anchoring member on that side, said last-mentioned anchoring member being a resilient ring, said anchoring plates being provided with keeper hooks for retention on said ring, and said ends of the chain sections being pivotally secured to said anchoring plates at the sides opposite to said keeper hooks, interconnected ring plates interposed between the ends of said chain sections opposite to the first-mentioned ends and slidably maintained in spaced relation to the side wall of the tire, the juxtaposed ends of said chain sections being detachably secured to said ring plates, means for supporting said ring plates on the wheel of the tire, said means including first and second bars clampingly engaging the wheel, an angular bar supported by each pair of said first and second bars and having an inturned end for receiving said ring, the opposite end of said angular bar slidably supporting one of said ring plates.

3. The structure defined in claim 1, wherein the remaining anchoring member embodies a plurality of arcuate links having overlapping ends pivotally connected to one another, said links being provided intermediate their respective ends with aperture means, the coacting ends of said chain sections being provided with snap fasteners releasably engageable with their respective aperture means.

4. In a tire chain appliance, a hoop-like anchoring member positionable on one side of and in approximate parallelism with a wheel and in the form of a resilient ring embodying spring coils and separably connected ends, a second complemental anchoring member positionable on the opposite side of and in general spaced parallelism to the last-named side of said wheel and embodying a plurality of arcuate links having adjacent ends arranged in overlapping relationship and pivotally connected together, the intermediate portions of said links being provided with aperture means, means for detachably mounting said anchoring members on their respective sides of said wheel comprising a plurality of equidistant circumferentially spaced devices each including first and second bars clampingly engaging the wheel, bolt and nut means joining the bars in superimposed and aligned as well as adjustable relationship, a plurality of circumferentially spaced transverse cross chains having snap hooks on corresponding ends engageable with the aperture means in the respective adjacent links, and anchoring plates pivotally connected to the opposite corresponding ends of said cross chains, said plates having keeper hooks and said keeper hooks being releasably engageable with said first-named anchoring member.

5. The structure specified in claim 4 in combination with a third clamping bar one end of which is connectible with the bolt and nut means, the other end thereof having a lateral terminal which is adapted to bear against an adjacent side of the vehicle wheel.

GEORGE W. CARUOLO.

REFERENCES CITED

The following references are of record in the file of this patent:

UNITED STATES PATENTS

| Number | Name | Date |
|---|---|---|
| 1,025,159 | Raymond | May 7, 1912 |
| 1,163,408 | Hunter | Dec. 7, 1915 |
| 1,336,363 | McLaughlin | Apr. 6, 1920 |
| 1,714,720 | Meyer | May 28, 1929 |
| 2,146,453 | Stahl | Feb. 7, 1939 |
| 2,286,011 | Ridgway | June 9, 1942 |
| 2,315,060 | Kane | Mar. 30, 1943 |
| 2,469,235 | Lindenthaler | May 3, 1949 |
| 2,506,247 | Sweeney | May 2, 1950 |